United States Patent Office 3,357,639
Patented Dec. 12, 1967

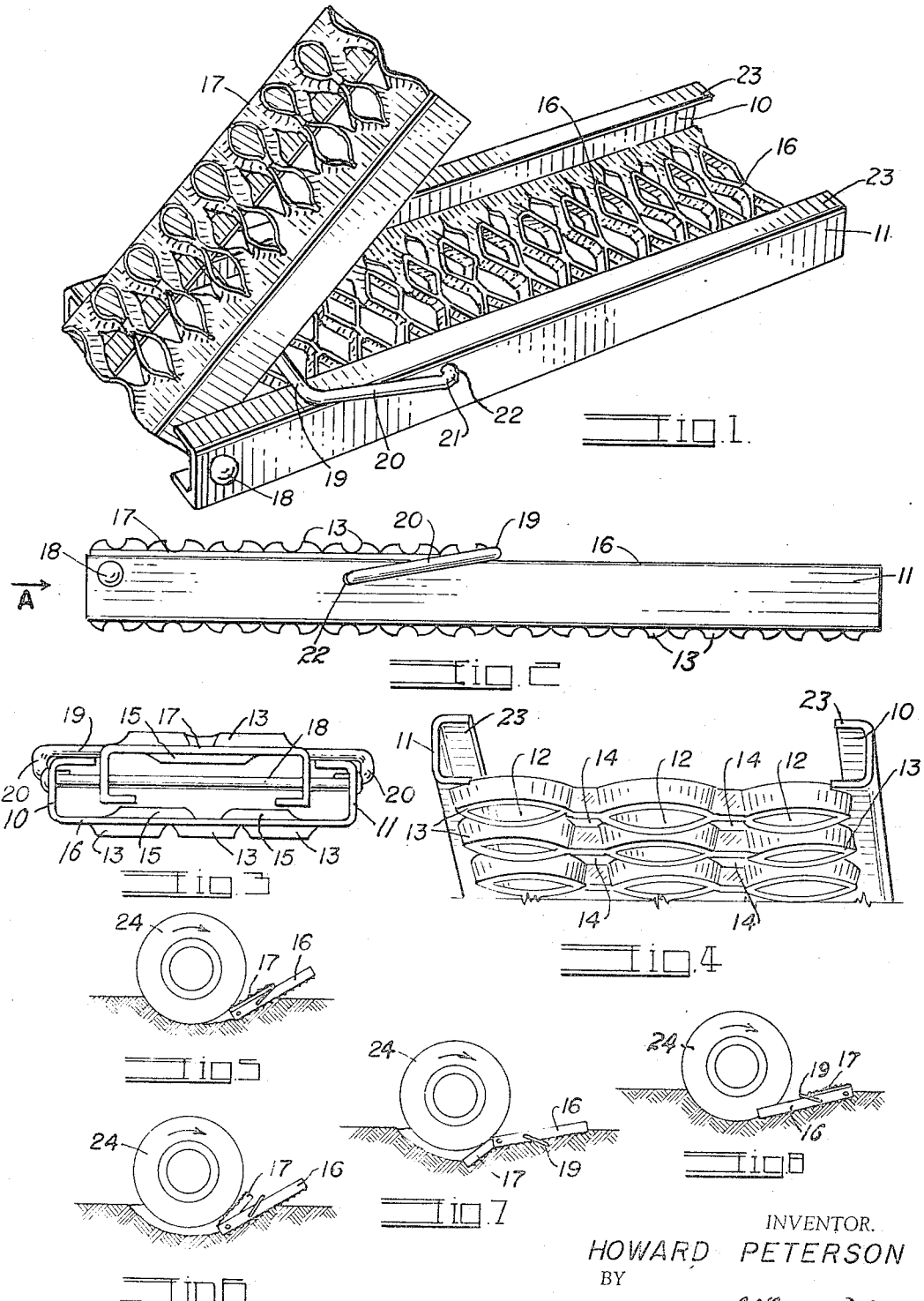

3,357,639
TRACTION MAT AND WHEEL CHOCK FOR AUTOMOTIVE VEHICLES
Howard Peterson, 825 York St.,
Denver, Colo. 80206
Filed Nov. 17, 1966, Ser. No. 595,255
3 Claims. (Cl. 238—14)

This invention relates to a combined traction mat and wheel chock unit for automotive vehicles for use both under and in front of a drive wheel of a vehicle which has become imbedded or bogged down in a chuck-hole, or in mud, sand or snow, so as to provide sufficient traction to extricate the vehicle and which can also be used as a chock to effectively and safely prevent accidental movement of the vehicle on an incline or when tires, wheels and chains are being installed or replaced thereon.

The principal object of the invention is to provide a complete permanently-assembled unit for the above purpose: which can be folded so as to require but a minimum of storage space in the vehicle and yet will be exceedingly rugged so as to withstand the heavy strains, stresses and rough usage to which such devices are subjected; which can be quickly and easily manipulated to form either a wheel chock or a traction mat; which will provide a slip-proof-engagement with both the wheel and the roadway or other supporting surface when used either as a traction mat or as a wheel chock; and which will provide longitudinally-extending side guide elements to retain the wheel in position on the unit.

Other objects and advantages reside in the detail construction of the invention, which is designed for simplicity, economy, and efficiency. These will become more apparent from the following description.

Briefly, the unit comprises two channel-shaped tread members of differing lengths hinged together at their one extremity, so the shorter tread member may be nested within the confines of the longer tread member, and provided with a swinging hasp member which can be swung between the two tread members to maintain them at a fixed angle to each other. Each tread member is provided with a slip-proof surface on both its upper and lower surfaces and with side guide elements for maintaining the unit in alignment with the path of a wheel.

In the following detailed description of the invention, reference is made to the accompanying drawing which forms a part hereof. Like numerals refer to like parts in all views of the drawing and throughout the description.

In the drawing:

FIG. 1 is a perspective view of the combined traction mat and wheel chock unit of this invention, illustrating it in what will be termed the wheel-chock position;

FIG. 2 is a side elevational view of the unit, illustrated in what will be termed the traction mat position;

FIG. 3 is an end elevational view thereof looking in the direction of the arrow A in FIG. 2;

FIG. 4 is an enlarged, fragmentary detail view showing the type of tread member employed in this invention; and FIGS. 5, 6, 7 and 8 are diagrams showing various positions to be later described, in which the unit may be positioned relative to the slipping wheel of an automotive vehicle.

The improved unit is principally formed from elongated structural elements such as are conventionally used for gratings, floors, stair treads and platforms in manufacturing plants, power houses and the like for providing open, skid-proof walkways. Such elements are commercially known as "Grip Struts."

Such struts are stamped from metallic plates to form elongated struts having two parallel, spaced-apart, upwardly-facing side-channels 10 and 11. The plate is stamped to form transversally-extending rows of somewhat diamond-shaped, openings 12 surrounded by downwardly-extending traction flanges 13 and similar diamond-shaped intermediate openings 14 surrounded by upwardly-extending traction flanges 15. The intermediate openings 14 are positioned between the rows of openings 12 and in staggered relation therewith, as shown in FIG. 4. The struts are obtainable in various widths with various numbers of openings in the rows.

To form this invention, one of the above struts is positioned with its side-channels extending upwardly to provide a relatively long base element 16. Another similar but narrower and shorter one of said struts, which will be herein referred to as the pivoted element 17, is positioned between the side channels of the base element 16 with its side channels extending downwardly. The pivoted element 17 is pivotally mounted at one end to one end of the base element 16 by means of a hinge rod 18 which is fixed to the side channels of the base element and extends through the side channels of the pivoted element 17 so that the latter may be swung from a nested traction mat position in the base element 16, as shown in FIG. 2, to an extended traction mat position, such as shown in FIG. 7.

The pivoted element 17 may be supported at a 45° incline relative to the base element 16 so as to form a wheel chock position, as shown in FIG. 1, by means of a hinged, U-shaped, hasp rod 19 the side legs of which, designated by numeral 20, are positioned exteriorly of the two side channels 10 and 11 of the base element 16 and are turned inwardly at their extremities, as shown at 21, to enter pivot openings 22 in the side channels. The length of the legs 20 relative to the position of the pivot openings 22 is such that in the nested position, the hasp rod 19 can be swung forwardly to lie closely along the transverse edge of the free extremity of the pivoted element 17 to form a straight lip on the latter, as shown in FIG. 2, and can be swung rearwardly to lie beneath the channel sides of the pivoted element 17 to support the latter on the side channels of the base element 16 in the inclined chock position of FIG. 1.

In a typical, successfully-operating, working model, the base element is 18" long and 7" wide and the pivoted element 17 is 9" long and 5" wide and fits closely between the side channels of the base element 16. The side channels of both elements have a height of 1½" and a width of ⅞".

For wheel chock purposes, the unit is set up as shown in FIG. 1. For simple traction mat purposes, the unit is positioned as diagrammatically shown in FIG. 8. The unit can be set up and used in many other ways to extricate a mired vehicle. For instance, it may be placed in the nested position beneath or forwardly of a slipping wheel, as shown in FIG. 5. The tire will then engage and urge the rear extremity of the pivoted element 17 downwardly so as to swing the latter element rearwardly and upwardly to bring the non-slip plate surface thereof against the tire to provide forward traction, as shown in FIG. 6. Or the unit may be inverted and extended and the pivoted element 17 pressed into the ground forwardly of the slipping wheel, as shown in FIG. 7, to cause the wheel to travel upwardly on the pivoted element 17, thence forwardly on the base element 16. Many other positions will occur to a user and since both faces of both elements have non-slip characteristics, due to the oppositely-projecting flanges 13 and 15, the unit can be inverted and manipulated into numerous positions to rectify the conditions encountered on the road without destroying the fact that a non-slip contact will always be maintained with both the tire and the roadway.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A combined traction mat and wheel chock unit for automotive vehicles comprising:
   (a) an elongated base element consisting of an elongated rectangular perforated metal plate;
   (b) a rigid, upturned side on each longitudinal edge of said plate, said sides extending longitudinally of said plate in parallel, spaced-apart relation;
   (c) a pivoted element consisting of a second elongated rectangular, perforated, metal plate of less length than said base element and having rigid, downwardly-turned sides similar to the sides of said base element, the downwardly turned sides of said pivot element being positioned between the upturned sides of said base element with one extremity of each element aligned with one extremity of the other element;
   (d) a hinge rod extending through the sides of both elements at said one extremity to hingedly secure said elements together at that extremity;
   (e) a hasp rod having a rectangular U-shaped conformation to provide a straight portion and two angularly turned leg portions, said straight portion resting upon and extending transversally between the sides of said base element; and
   (f) means pivoting the extremities of said leg portions to the sides of said base element so that said straight portion of said rod may be swung to a supporting position beneath said pivoted element to support the latter at an incline and to a non-supporting position to allow said pivoted element to nest between the sides of said base element.

2. A combined traction mat and wheel chock unit as described in claim 1 having projecting flanges surrounding the perforations in the metal plates of both said base element and said pivoted element, certain of said flanges projecting outwardly from one face of each metal plate and the other of said flanges projecting oppositely outward from the other face of each metal plate to provide non-slip surfaces upon both faces of both said pivoted element and said base element.

3. A combined traction mat and wheel chock unit as described in claim 2 having flanges extending along the longitudinally-extending sides on both said base element and said pivoted element, the flanges at the opposite sides of both elements being turned inwardly toward each other to form guides for a wheel travelling therealong.

No references cited.

ARTHUR L. LA POINT, *Primary Examiner.*

R. A. BERTSCH, *Assistant Examiner.*